Patented July 18, 1939

2,166,617

UNITED STATES PATENT OFFICE 2,166,617

PHOTOGRAPHIC PROCESSING

John R. Weber, South River, and Virgil B. Sease, New Brunswick, N. J., assignors to Du Pont Film Manufacturing Corporation, New York, N. Y., a corporation of Delaware No Drawing. Application April 7, 1937, Serial No. 135,579

6 Claims. (Cl. 95—2)

This invention relates to photography and more particularly to photographic processing that includes an improved method for providing photographic partial records required for either additive or subtractive color processes.

One object of this invention is to provide a method for limiting the action of a processing bath to at least a single layer of a series of layers. Another object is to provide a method for removing an outer of a plurality of superposed images by means of a highly concentrated fixing bath. A further object is to provide chemical means for obtaining individual color separation records from superposed color component records. Another object is to provide chemical means whereby individual color component records may be obtained from integrally superposed records formed in multilayered monopacks. A further object is to provide a method whereby multipack photographic records may be extended to form at least one more individual color record than the number of films in the multipack. Further objects will more plainly appear from the detailed description that is presented in exemplification and not in limitation herein.

In the art of subtractive color photography many forms and modifications of multipack films have been suggested. In the simpler arrangement, one of the films records one region of colors of the scene while the other film records another region. In the tripack arrangements each element records a given portion of the colors representing the original color scale.

Many disadvantages are present in these forms of multipack. In the bipack arrangement, the separation of the color range photographed by the two differently-sensitized films is known to be inconvenient and incomplete. In the ordinary tripack arrangement, the separation of the color scale into individual color component records is never satisfactory as the image of the rear film lacks detail and sharpness. Furthermore, in printing, the image from the rear film is toned blue and represents the "drawing" of the scene, and this loss of sharpness is also highly undesirable in the basic element of a three-color print. In order to minimize this loss of image sharpness, the art has suggested certain camera arrangements wherein the middle and rear films of the ordinary tripack are exposed as a bipack arrangement at one aperture of the camera while the front film is exposed at a second aperture. These cameras are cumbersome and expensive, and require vigilant checking to ensure that the intricate optical system required is in alignment. Such cameras are rarely adaptable for black and white photography, and have failed to fill the urgent need in the industry for an inexpensive and simplified process that will reproduce faithful color.

These and many other disadvantages of the prior art for providing individual component color records are eliminated by the present invention hereinafter described. The present invention provides chemical means for obtaining at least three separate color-component records by simultaneous exposure on a bipack or monopack in any ordinary camera either for still or motion picture photography. It is directed primarily to obtaining three component records because it is recognized that a minimum of three colors is required for the reproduction of natural color. By the unusually novel process hereinafter described, however, it is possible to actually obtain more than three individual color records from simultaneous exposures.

In the present invention use is made for the first time in the history of photography of the slow action of highly concentrated and unusually viscous baths of sodium thiosulfate, commonly known as "hypo", to regulate its dissolving action on silver salts to limit it to an outer of several superposed images or image layers. Ordinary hypo, or fixing, baths contain between 25 and 35% of sodium thiosulfate, based on the crystalline form of the salt, but at these concentrations the rate of solution of silver halide salts is too rapid to enable one to limit its action to a single image layer of several superposed layers.

In multilayered coatings of photographically sensitive layers, the coatings are generally quite thin and the ordinary fixing baths dissolve the silver salts generally in less than a minute. Since the outer image is attacked first, and by a fixing bath which contains less dissolved silver salts than when it reaches the lower layers, the outer layer is fixed in less than a third of the time required to fix a film carrying three sensitive layers. Thus, the time of fixation, of an outer image layer is so rapid that the fixing bath begins to dissolve some of the inner layers before its action can be stopped. However, if the concentration of hypo in the fixing bath is increased to approximately 50% by weight or more, the rate of fixing, or the rate of solution of silver salts is decreased at least 3 times over that for a 25% solution. At concentrations around 80%, the rate of fixation is about 4½ times slower than that of a 25% solution. This decrease in rate of solution, or fixation rate is due, partially, to the excessively viscous nature of highly concentrated hypo solutions. The relative viscosity of an ordinary 25% solution of hypo is about 120 at 20° centigrade but, at the same temperature, an 80% hypo solution has a relative viscosity of about 850, based on water as having a viscosity of 100 at 20° centigrade. The excessively viscous nature of these highly concentrated hypo solutions acts to retard their penetration through the gelatine layers.

Thus, there is pioneered by this invention, an ingenious and novel method for augmenting the viscosity of, and thereby regulating the penetration rate of, the hypo or fixing bath in a manner that depends solely on the high concentration of the active solute components. Thus it is possible to limit the action of a fixing bath to an outer of a plurality of superposed layers since it is now possible to time accurately the action and stop fixation by washing in water when the outer image layer has been fixed off and the coating is clear. Since hypo baths can be prepared which, at room temperatures, will contain as high as approximately 90% by weight of hypo, a wide range of control of fixation action and solution of silver salts is provided by this means.

This effect is true not only of the usual silver halide salts, such as the iodide, bromide, and chloride, but also of the ferrocyanide formed by treating silver with a solution of a ferricyanide such as is found in the ordinary bleaching baths used in photographic work. For reasons of economy, sodium thiosulfate or hypo solutions are employed as the preferred fixing bath but it is also possible to use other silver salt solvents. Thus, a 60% by weight solution of ammonium thiocyanate may be used as a fixing bath but, in the use of this highly concentrated thiocyanate bath, the gelatin emulsion layers should be first hardened by treatment with a 5% formaldehyde or acrolein solution since the ammonium thiocyanate, at these concentrations, exerts some solvent action on unhardened gelatin layers.

In a preferred embodiment of the present invention a multipack film arrangement, in which one of the supports carries at least two differently color-sensitive layers, is used to record individual color components. Thus, the bipack may consist of a transparent support carrying a blue-sensitive photographic layer in which is incorporated a removable yellow dye such as Luxol Yellow. Facing this front film, and in contact with it, is a second support coated with green-and-red-sensitive layers. In the preferred form a red sensitive photographic layer is coated on the support, over this is coated a water-permeable layer, such as gelatine, casein and the like, stained red with a removable dye such as Congo Red (Rowe's Index No. 370) or Carmosin M (Rowe's Index No. 179) and on this is coated a green sensitive photographic layer. The latter emulsion is in contact with the emulsion surface of the front film and all sensitive layers are of the well-known silver halide gelatine emulsion type. Upon exposure to a natural or colored scene all color records are formed simultaneously: the blue record is formed in the emulsion layer of the front film, the green record is formed in the top layer of the rear film and the red record is formed in the lower layer. After exposure, the two films are given the usual processing treatment, such as development, fixation and washing which results in the formation of component color records in terms of metallic silver images in the different layers, two superposed color component records being formed on the rear film.

The record on the front film is an individual record and subsequently may be printed onto a suitable printing medium, such as a positive stock or duplicating stock film. The rear film now carries a series of two, superposed, color-component records in terms of metallic silver. A print, or intermediate record, is made of the superposed images onto a printing stock such as the well-known "positive" type of printing stock, however, the type of printing medium may be varied to suit the individual case. After printing the superposed images, the print is developed, fixed, washed and dried. The baths used for the processing of this print are of the well-known types.

The characteristics of speed and contrast of the printing medium, the printing exposure and the development given the print may all be varied to obtain a satisfactory print. Such a print is one which, when placed in registered superimposition with the original negative, the details of the images of the individual films are cancelled out and the combined films present the appearance of a neutral deposit of even transparency. The desired quality of the positive print may also be described as that condition wherein the "gamma" of the print is approximately unity and all the silver densities of the image lie on the portion of the curve commonly known as the straight line portion of the characteristic curve of the printing medium. The former of these two methods of determining the satisfactory quality of the print is particularly convenient to the still photographer who is usually not equipped with sensitometric apparatus. The second method is particularly adaptable to the motion picture processing laboratory wherein the determination of the "gamma" of printing stock is a routine operation.

After the formation of the three initial, component color records and the intermediate record from the film carrying the superposed component color record images, one of the superposed images is eliminated by removal from the multi-layered film as will now be explained.

In this form of this invention, an outer of a plurality of superposed images is removed or eliminated, but, as will later be explained, it is also contemplated to eliminate by fixation several upper images by the use of concentrated hypo baths. In carrying out the preferred form of this invention wherein a single outer image layer is removed, the film carrying several superposed images is treated so as to convert the silver deposits into a salt form whereby the silver salts can be removed by solution in a silver salt solvent. As examples of the class of silver-salt formers, commonly known as "bleach-baths", the following are illustrative:

A

Potassium ferricyanide _____ grams __ 35
Ammonium hydroxide, concentrated ___ mls __ 5
Water to _____ liter __ 1

B

Potassium ferricyanide _____ grams __ 2.3
Potassium bromide _____ do ____ 2.3
Water to _____ liter __ 1

C

Cupric bromide _____ grams __ 8.0
Water to _____ liter __ 1

All of the superposed silver images are bleached to silver salts by any of the bleach baths described above in about 3 minutes. As is well-known, the bleach-bath may be applied also by means of spraying, beading-on with rollers, felt rollers, or the like. After bleaching all of the images, the film is washed and substantially all of the moisture is removed from at least the outer image layer by drying or by dehydration with alcohol. Since, in mutilayered coatings of gelatine, ordinary drying takes place by the evaporation of water from the outer layer first, it is possible to substantially dry only the outer layer by directing jets or nozzles of warm, dry air on the emulsion surface and thus save the time required to dry the remaining layers. However, the entire film may be dried before the outer image is removed. With at least the outer image layer dried, the film is treated with a 70% solution by weight of hypo in water. The film may be immersed in this hypo solution, or the solution may be locally applied to the emulsion surface by means of floatation, sprays, beading rolls, etc. The concentrated hypo solution is allowed to act until the outer image is fixed away, which step can be determined either by tests on separate films or by simply observing when the image representing the component recorded on that particular emulsion has disappeared. The film is then washed and the remaining silver salt images are redeveloped by any suitable developer such as, for example, the following:

| | |
|---|---|
| Sodium sulfite, anhy. grams | 60.0 |
| Hydrochinon do | 4.9 |
| Sodium carbonate, anhy. do | 48.0 |
| Metol do | 1.6 |
| Potassium bromide do | 1.6 |
| Water to liter | 1 |

The multilayered film, from which one image has been removed, is then washed and dryed.

The multilayer film, from which one of the component records has been eliminated, is now printed in registered contact with the intermediate record which was printed from the multilayer film before the removal of one of its component records.

By printing these two records in combination there is formed a record representing the image which was removed from the multilayer film. This printing medium may be of the well-known non-color-sensitized "positive" type emulsion, in the use of which the printing exposure is made by ordinary, visible radiations. However, the printing medium may be sensitized to regions of the radiation spectrum lying beyond the visible range. Thus the printing emulsion may be sensitized to the ultra-violet region and only ultra-violet radiation used for the printing exposure. In like manner, the printing medium may be sensitized to the infra-red region and the printing exposure made with infra-red radiation. After printing, the new printed record is formed according to the well-known processing steps of developing, fixing, washing and drying. If the original images on the multilayer film were those commonly recognized as "negative" images, the final record made by exposing through a print made from the original multilayered negative, in combination with the multilayered negative with one of the component records removed, results in a duplicate negative of the record removed by bleaching and fixing. The record remaining in the multilayered film is another of the component records while the record formed on the front film of the bi-pack is the third component color record. Thus, three individual color-component records are obtained from a modified bipack film subjected to the above described procedure of printing an intermediate record of superposed component records, removing one of the component records by the process which includes the step of subjecting the bleached images to the retarded dissolving action of a concentrated hypo bath and "duping" off the eliminated record from the composite print by passing a printing exposure through the intermediate record in registered combination with the multilayered record minus one of its original image records.

The foregoing steps in the novel process just described may be summarized by the following tabulation:

1. Original exposure on a multipack in which one film support carries at least two differently sensitized photographic layers.
2. Formation of color component records in the multipack by development, fixing, washing and drying.
3. Making a print or intermediate record of the multilayered film.
4. Converting superposed, color component images on original mutilayered film to silver salt images.
5. Retarded fixing or dissolving off outer image by excessively viscous hypo solution.
6. Re-development of remaining images.
7. Making a print through intermediate record (formed in Step 3) of original multilayered record in combination with multilayered record minus an outer image.

While the foregoing preferred form of this invention has dealt with a multilayered film of a bipack system in which two records are formed on the multilayered film it is also possible, by the method above described to utilize a monopack of three or more differently sensitized layers which may be separated by water permeable layers of gelatin and the like, at least one of which is dyed to act as a filter layer, to form color component records and by the process which includes the steps of converting all the images to silver salts and removing an outer image by treatment with concentrated hypo solution, reform the eliminated image as a separate individual record image by printing through an intermediate record of the superposed images and the multilayered film from which an outer image has been eliminated. This process is then repeated for a second image layer so that duplicate records are formed as separate films of the originally superposed color component records. The inner or lower component record remaining or the original multilayered film.

The present invention may also be advantageously applied in composite or trick cinematography for the preparation of traveling mattes wherein an object is photographed under one quality of illumination against a background of another quality of illumination onto a multilayered film instead of the bipack film employed in the prior art. Thus, the present invention permits for the first time the differently sensitized layers of a multilayer film to record the object on one, and the background on the other of said layers. For the purpose of preparing a travelling matte for printing either the object or the background elements of the composite picture one of the images recorded by the multilayered film may be removed by the herein described novel process including the step of retarding the fixing rate by employing a highly viscous fixing solution.

The herein described invention has made possible the removal or elimination of a single image layer of a series of superposed layers of images by subjecting them to highly concentrated, viscous solutions of silver salt solvents. The three color-component records thus formed can be used for the various color-photography processes which require three color-separation negatives. It is further contemplated that the original exposure on the sensitive multi- or mono-packs need not be confined to an original scene but may also represent the printing exposure through a colored transparency as in the case of making color separation and composite-photography negatives.

The herein described preferred embodiments are given in illustration and not in limitation of the invention which is intended to include all variations and modifications within the spirit and scope of the appended claims.

We claim:

1. A process of treating a photographic element having at least two superimposed layers each containing a water-insoluble silver salt image record, which comprises treating said element with a solution containing from approximately 50% to approximately 90% by weight of a fixing agent selected from the group consisting of water-soluble thiosulfates and water-soluble thiocyanates, until the outer only of said records is removed.

2. A process as set forth in claim 1 wherein at least the outer layer is dried before treated with the fixing agent.

3. A process of treating a photographic element having at least two superimposed layers each containing a water-insoluble silver salt image record, which comprises treating said element with a solution containing from approximately 50% to approximately 90% by weight of sodium thiosulfate, until the outer layer only of said records is removed.

4. A process as set forth in claim 3 wherein the outer layer is dried before treatment with the sodium thiosulfate.

5. A process of treating a photographic element having at least two superimposed layers each containing a water-insoluble silver salt image record which comprises treating said element with a solution containing from approximately 50% to approximately 90% by weight of ammonium thiocyanate until the outer layer only of said records is removed.

6. A process of treating a photographic element having at least two superimposed gelatin layers each containing a water insoluble silver salt image record which comprises hardening the gelatin layers and then treating said element with a solution containing from approximately 50% to approximately 90% by weight of ammonium thiocyanate, until the outer layer only of said records is removed.

JOHN R. WEBER.
VIRGIL B. SEASE.

CERTIFICATE OF CORRECTION.

Patent No. 2,166,617.  July 18, 1939.

JOHN R. WEBER, ET AL.

It is hereby certified that error appears in the printed specification of the above numbered patent requiring correction as follows: Page 3, first column, line 34, in the right-hand column of the table opposite "Metol" for the numeral "1.6" read 1.4; and that the said Letters Patent should be read with this correction therein that the same may conform to the record of the case in the Patent Office.

Signed and sealed this 5th day of September, A. D. 1939.

Henry Van Arsdale, (Seal)  Acting Commissioner of Patents.

The herein described invention has made possible the removal or elimination of a single image layer of a series of superposed layers of images by subjecting them to highly concentrated, viscous solutions of silver salt solvents. The three color-component records thus formed can be used for the various color-photography processes which require three color-separation negatives. It is further contemplated that the original exposure on the sensitive multi- or mono-packs need not be confined to an original scene but may also represent the printing exposure through a colored transparency as in the case of making color separation and composite-photography negatives.

The herein described preferred embodiments are given in illustration and not in limitation of the invention which is intended to include all variations and modifications within the spirit and scope of the appended claims.

We claim:

1. A process of treating a photographic element having at least two superimposed layers each containing a water-insoluble silver salt image record, which comprises treating said element with a solution containing from approximately 50% to approximately 90% by weight of a fixing agent selected from the group consisting of water-soluble thiosulfates and water-soluble thiocyanates, until the outer only of said records is removed.

2. A process as set forth in claim 1 wherein at least the outer layer is dried before treated with the fixing agent.

3. A process of treating a photographic element having at least two superimposed layers each containing a water-insoluble silver salt image record, which comprises treating said element with a solution containing from approximately 50% to approximately 90% by weight of sodium thiosulfate, until the outer layer only of said records is removed.

4. A process as set forth in claim 3 wherein the outer layer is dried before treatment with the sodium thiosulfate.

5. A process of treating a photographic element having at least two superimposed layers each containing a water-insoluble silver salt image record which comprises treating said element with a solution containing from approximately 50% to approximately 90% by weight of ammonium thiocyanate until the outer layer only of said records is removed.

6. A process of treating a photographic element having at least two superimposed gelatin layers each containing a water insoluble silver salt image record which comprises hardening the gelatin layers and then treating said element with a solution containing from approximately 50% to approximately 90% by weight of ammonium thiocyanate, until the outer layer only of said records is removed.

JOHN R. WEBER.
VIRGIL B. SEASE.

CERTIFICATE OF CORRECTION.

Patent No. 2,166,617.                        July 18, 1939.

JOHN R. WEBER, ET AL.

It is hereby certified that error appears in the printed specification of the above numbered patent requiring correction as follows: Page 3, first column, line 34, in the right-hand column of the table opposite "Metol" for the numeral "1.6" read 1.4; and that the said Letters Patent should be read with this correction therein that the same may conform to the record of the case in the Patent Office.

Signed and sealed this 5th day of September, A. D. 1939.

Henry Van Arsdale, (Seal)                      Acting Commissioner of Patents.